(12) United States Patent
Xia

(10) Patent No.: US 9,801,057 B2
(45) Date of Patent: Oct. 24, 2017

(54) WIRELESS NETWORK ACCESS TECHNOLOGY

(71) Applicant: Huawei Technologies Co., Ltd., Shenzhen, Guangdong (CN)

(72) Inventor: Bin Xia, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 360 days.

(21) Appl. No.: 14/522,081

(22) Filed: Oct. 23, 2014

(65) Prior Publication Data
US 2015/0043561 A1   Feb. 12, 2015

Related U.S. Application Data

(63) Continuation of application No. PCT/CN2013/070145, filed on Jan. 7, 2013.

(30) Foreign Application Priority Data

Apr. 24, 2012   (CN) .......................... 2012 1 0122902

(51) Int. Cl.
| | |
|---|---|
| *H04W 12/06* | (2009.01) |
| *H04W 76/02* | (2009.01) |
| *H04W 4/14* | (2009.01) |
| *H04W 84/12* | (2009.01) |

(52) U.S. Cl.
CPC .......... *H04W 12/06* (2013.01); *H04W 76/02* (2013.01); *H04W 4/14* (2013.01); *H04W 84/12* (2013.01)

(58) Field of Classification Search
CPC ..... H04W 12/06; H04W 76/02; H04W 76/04; H04W 74/002; H04L 9/32
See application file for complete search history.

(56) References Cited

U.S. PATENT DOCUMENTS

2005/0177515 A1* 8/2005 Kalavade ............ H04L 63/0853
                                                              705/52
2005/0220099 A1* 10/2005 Igarashi .............. H04L 61/2015
                                                              370/389
(Continued)

FOREIGN PATENT DOCUMENTS

| CN | 1874595 A | 12/2006 |
|---|---|---|
| CN | 101335984 A | 12/2008 |

(Continued)

*Primary Examiner* — Redentor Pasia
(74) *Attorney, Agent, or Firm* — Kilpatrick Townsend & Stockton LLP

(57) ABSTRACT

Embodiments of the present invention relate to a method and a terminal for accessing a wireless network, a Wi-Fi access network node, and an authentication server. The method includes: sending, by a client on a terminal, registration information of a user to an authentication server, where the registration information includes a terminal identifier and/or a user identifier that is not entered by the user; and sending, by the client, a connection request to the Wi-Fi access network node, where the connection request includes the terminal identifier and/or the user identifier that is not entered by the user, so that the Wi-Fi access network node controls, according to the authentication information and the connection request, whether the terminal accesses the Wi-Fi access network node.

3 Claims, 11 Drawing Sheets

(56) References Cited

U.S. PATENT DOCUMENTS

| | | | |
|---|---|---|---|
| 2005/0286461 A1* | 12/2005 | Zhang | H04W 76/021 370/328 |
| 2006/0063560 A1* | 3/2006 | Herle | H04W 36/32 455/552.1 |
| 2006/0245406 A1* | 11/2006 | Shim | H04L 63/0272 370/338 |
| 2007/0178885 A1* | 8/2007 | Lev | H04L 63/083 455/411 |
| 2008/0026724 A1* | 1/2008 | Zhang | H04L 63/08 455/411 |
| 2008/0320584 A1* | 12/2008 | Hamilton, II | H04L 63/0263 726/13 |
| 2009/0016369 A1* | 1/2009 | Banerjee | H04L 29/12009 370/408 |
| 2010/0189052 A1* | 7/2010 | Kavanagh | H04L 29/12915 370/329 |
| 2011/0055409 A1 | 3/2011 | Tsai | |
| 2012/0033679 A1* | 2/2012 | Horn | H04W 48/10 370/401 |
| 2014/0215583 A1 | 7/2014 | Ding | |
| 2014/0237250 A1* | 8/2014 | Menezes | H04L 9/3213 713/172 |
| 2015/0065086 A1* | 3/2015 | Linkola | H04W 12/08 455/406 |
| 2016/0036922 A1* | 2/2016 | Centemeri | H04W 76/022 370/328 |

FOREIGN PATENT DOCUMENTS

| | | |
|---|---|---|
| CN | 101662757 A | 3/2010 |
| CN | 101662771 A | 3/2010 |
| CN | 102378175 A | 3/2012 |
| CN | 102638797 A | 8/2012 |
| TW | 201108685 A | 3/2011 |

\* cited by examiner

WIRELESS NETWORK ACCESS TECHNOLOGY

CROSS-REFERENCE TO RELATED APPLICATIONS

This application is a continuation of International Application No. PCT/CN2013/070145, filed on Jan. 7, 2013, which claims priority to Chinese Patent Application No. 201210122902.3, filed on Apr. 24, 2012, both of which are hereby incorporated by reference in their entireties.

TECHNICAL FIELD

The present invention relates to the field of wireless communications, and in particular, to a technology for accessing a wireless network.

BACKGROUND

Currently, in the field of wireless communications, a bandwidth of a wireless network is limited. A quantity of users that can access each base station is limited. When the quantity of users is increased, a bandwidth available to each user is decreased, resulting in degradation of service quality of the wireless network. In view of this situation, a Wi-Fi network is widely established currently to implement short-distance network access, to mitigate a user capacity limitation confronting the base station.

Wi-Fi is generally known as wireless broadband and is a term published by an organization named "Wireless Ethernet Compatibility Alliance" (Wireless Ethernet Compatibility Alliance, WECA). Wi-Fi is translated as wireless fidelity in Chinese. It is a short-distance wireless transmission technology and supports radio signals for accessing the Internet within a scope of hundreds of feet. With development of technologies and emergence of standards such as IEEE 802.11a and IEEE 802.11g, currently the IEEE 802.11 standards are collectively called Wi-Fi. From an application perspective, a user first needs to have a user-end apparatus that is compatible with Wi-Fi before using Wi-Fi.

On a current Wi-Fi network, there are still problems with terminal authentication. A conventional terminal authentication solution implements authentication and maintains an authentication result in a session (session) manner. Every time a user uses the Wi-Fi network, the user needs to manually enter information such as a user name and a password. Operations are cumbersome and a login page in a browser cannot be closed. Security of this authentication process is poor, and an inherent risk of the conventional webpage manner, for example, interception of the user name and password by a third party, may exist. In addition, whether the user is online or offline is determined in a session refreshing manner, resulting in poor instantaneity.

SUMMARY

An embodiment of the present invention provides a method for accessing a wireless network, which can simply and reliably implement terminal authentication with a smaller change to an existing Wi-Fi network and a lower solution implementation cost. The term "and/or" in this specification describes only an association relationship between associated objects and represents that three relationships may exist. For example, A and/or B may represent the following three cases: Only A exists, both A and B exist, and only B exists.

According to one aspect, a method for accessing a wireless network is provided, where the method includes:

sending, by a client on a terminal, registration information of a user to an authentication server, where the registration information includes a terminal identifier and/or a user identifier that is not entered by the user, so that the authentication server sends authentication information, which is generated according to the registration information, to a wireless fidelity (Wi-Fi) access network node; and sending, by the client on the terminal, a connection request to the Wi-Fi access network node, where the connection request includes the terminal identifier and/or the user identifier that is not entered by the user, so that the Wi-Fi access network node controls, according to the authentication information and the connection request, whether the terminal accesses the Wi-Fi access network node.

According to another aspect, a method for accessing wireless network is provided, where the method includes:

receiving, by a wireless fidelity Wi-Fi access network node, a connection request sent by a client on a terminal;

receiving, by the Wi-Fi access network node, authentication information sent by an authentication server, where the authentication information is generated by the authentication server according to registration information received from the client on the terminal, and the registration information includes a terminal identifier and/or a user identifier that is not entered by a user; and controlling, by the Wi-Fi access network node according to the authentication information and the connection request, whether the terminal accesses the Wi-Fi access network node.

According to another aspect, a method for accessing wireless network is provided, where the method includes:

acquiring and saving, by an authentication server, registration information of a user sent by a client on a terminal, where the registration information includes a terminal identifier and/or a user identifier that is not entered by the user; and sending, by the authentication server according to an authentication request of a wireless fidelity Wi-Fi access network node, authentication information generated according to the registration information, to the Wi-Fi access network node, so that the Wi-Fi access network node controls, according to the authentication information, whether the terminal accesses the Wi-Fi access network node.

According to another aspect, a terminal is provided, where the terminal includes a client, and the client includes:

a registering unit, configured to send registration information of a user to an authentication server, where the registration information includes a terminal identifier and/or a user identifier that is not entered by the user, so that the authentication server sends authentication information, which is generated according to the registration information, to a Wi-Fi access network node; and a connecting unit is further configured to send a connection request to the Wi-Fi access network node, where the connection request includes the terminal identifier and/or the user identifier that is not entered by the user, so that the Wi-Fi access network node controls, according to the authentication information and the connection request, whether the terminal accesses the Wi-Fi access network node.

According to another aspect, a Wi-Fi access network node is provided, where the Wi-Fi access network node includes:

a receiving unit, configured to receive a connection request sent by a client on a terminal, where the connection request includes a terminal identifier and/or a user identifier that is not entered by a user; and is configured to receive authentication information sent by an authentication server, where the authentication information is generated by the authentication server according to registration information received from the client on the terminal, and the registration information includes the terminal identifier and/or the user identifier that is not entered by the user; and a processing unit, configured to control, according to the authentication information and the connection request, whether the terminal accesses the Wi-Fi access network node.

According to another aspect, an authentication server is provided, where the authentication server includes:

an acquiring unit, configured to acquire and save registration information of a user sent by a client on a terminal, where the registration information includes a terminal identifier and/or a user identifier that is not entered by the user; and a sending unit, configured to send, according to an authentication request of a Wi-Fi access network node, authentication information generated according to the registration information, to the Wi-Fi access network node, so that the Wi-Fi access network node controls, according to the authentication information, whether the terminal accesses the Wi-Fi access network node.

According to the embodiments of the present invention, user authentication can be conveniently and quickly performed by saving the terminal identifier and/or the user identifier of the terminal on the authentication server and the access network node, which avoids cumbersome user input operations and decreases a risk of user information theft. Meanwhile, in a solution provided by the embodiments of the present invention, a smaller change is made to an existing Wi-Fi network system, and only a corresponding upgrade needs to be performed on the authentication server and an access network without adding a new network device. Therefore, implementation costs of the solution are lower.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
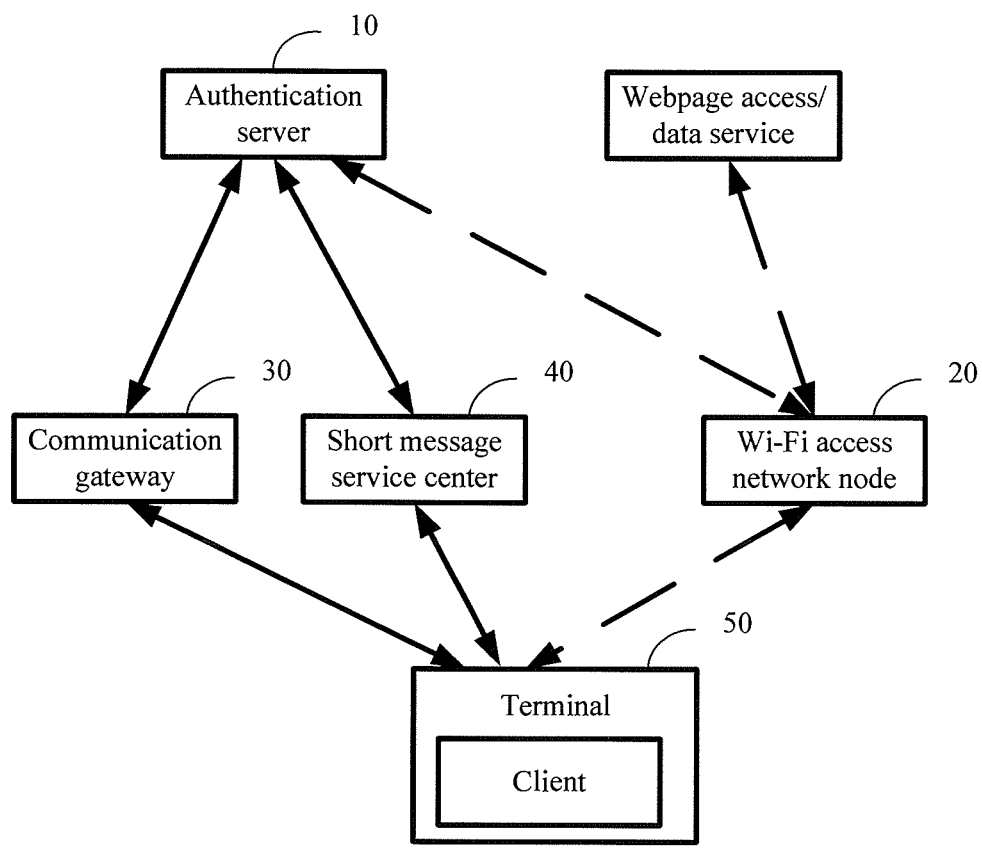
FIG. 1 is an architectural diagram of a Wi-Fi network system according to an embodiment of the present invention.

As shown in FIG. 1, an exemplary application scenario of an embodiment of the present invention is a Wi-Fi network system. Herein the Wi-Fi network system may include an authentication server 10, a Wi-Fi access network node 20, a communication gateway 30, a short message service center 40, a terminal 50, and a client running on the terminal 50. An Internet webpage access/data service server communicates with the Wi-Fi network system through the Wi-Fi access network node 20. According to the embodiment of the present invention, the authentication server 10 is configured to provide an authentication service for the terminal; the Wi-Fi access network node 20 provides the terminal 50 with Wi-Fi access and a capability of initiating authentication to the authentication server 10; the communication gateway 30 and/or the short message service center 40 provides a service for the terminal 50 to access the authentication server 10, for example, forwarding registration information of a user from the terminal 50 to the authentication server 10; and based on a capability of the terminal 50, the client running on the terminal 50 provides a Wi-Fi authentication function for the user. With reference to the application scenario in FIG. 1, the following describes a specific implementation process of the method provided by the embodiment of the present invention. It should be noted that, the application scenario illustrated in FIG. 1 is only an example and does not limit the application scenario of the embodiment of the present invention; moreover, the Wi-Fi network illustrated in FIG. 1 may include another network device to implement another function as required.

Figure 2A:
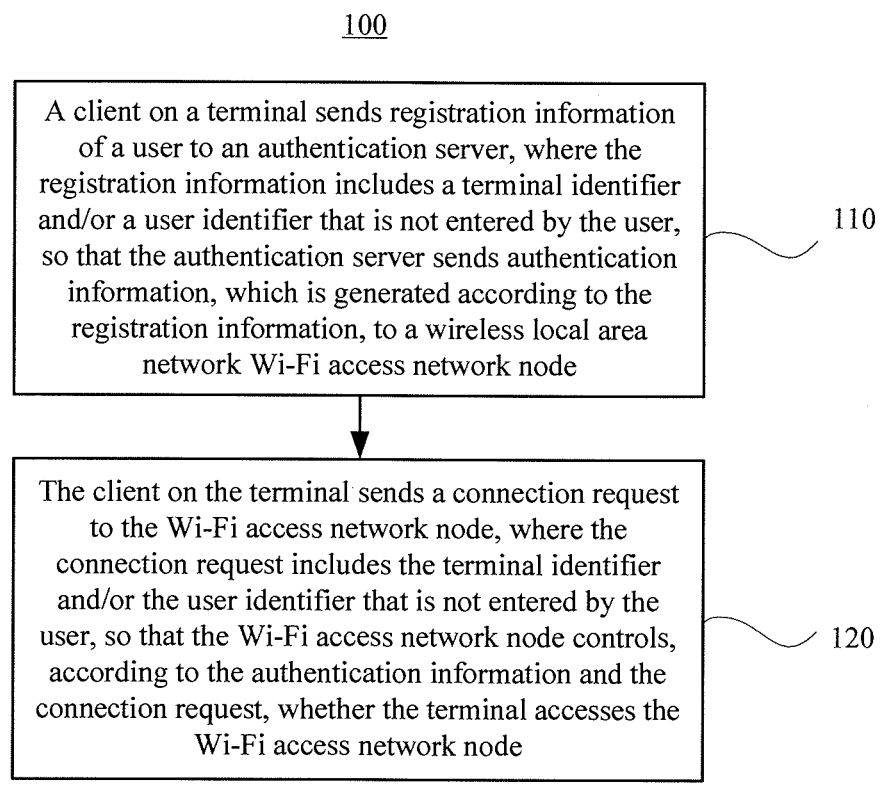
FIG. 2A is a schematic flowchart of a method according to an embodiment of the present invention.

FIG. 2A is a schematic flowchart of a method 100 for accessing a wireless network according to an embodiment of the present invention. As shown in FIG. 2A, the method 100 includes:

110. A client on a terminal sends registration information of a user to an authentication server, where the registration information includes a terminal identifier and/or a user identifier that is not entered by the user, so that the authentication server sends authentication information, which is generated according to the registration information, to a Wi-Fi access network node.

The foregoing "not entered by the user" indicates: not manually entered by the user, not manually entered with participation of the user, and also not entered with participation of the user according to a computer instruction. The authentication information may be carried by the terminal according to a communication capability of the terminal or may be identified by a network system according to information from the terminal.

In a specific example, when the terminal enters a coverage area of the Wi-Fi network, the terminal may search out a Wi-Fi access network node. The user may select a Wi-Fi access network node as the Wi-Fi access network for subsequently receiving authentication information and a connection request. Herein the registration information of the user includes a terminal identifier of the terminal that submits the registration information of the user or a user identifier of a user who uses the terminal or both. Under a circumstance in which the user uses a mobile phone as the terminal to use the wireless network, the terminal identifier may be a Media Access Control (Media Access Control, MAC for short) address of the mobile phone, and the user identifier may be a mobile phone number. A name of the Wi-Fi access network node selected by the user may also be included in the registration information of the user.

The client on the terminal may send the registration information of the user to the authentication server in various manners. For example, the client on the terminal stores a service number of the authentication server, and the client sends an SMS message to the authentication server through a short message service center according to the service number, so that the authentication server acquires the terminal identifier and/or the user identifier according to content or sender information of the SMS message; or, the client on the terminal stores an address of the authentication server, and the client sends a registration request to the authentication server through a communication gateway according to the address, so that the authentication server acquires the terminal identifier and/or the user identifier according to the registration request. Preferably, a binding relationship between the terminal identifier and the user identifier may be notified to the authentication server.

120. The client on the terminal sends a connection request to the Wi-Fi access network node, where the connection request includes the terminal identifier and/or the user identifier that is not entered by the user, so that the Wi-Fi access network node controls, according to the authentication information and the connection request, whether the terminal accesses the Wi-Fi access network node.

Preferably, when the user needs to use or starts to use the wireless network, for example, when the user needs to browse a webpage or access data, the connection request is sent to the Wi-Fi access network node by using the terminal.

Preferably, when the terminal is allowed to access the Wi-Fi access network node, that is, when authentication is successful, the client may display that the terminal has accessed the Wi-Fi access network node; otherwise, the client may display that the terminal has not accessed the Wi-Fi access network node.

Preferably, after the terminal has accessed the Wi-Fi access network node or the client displays that the terminal has accessed the Wi-Fi access network node, the terminal may request to access a webpage or a data service through the Wi-Fi access network node.

Specifically, when the terminal requests to browse the webpage or access the data, the client on the terminal sends a webpage access and/or data service request to the Wi-Fi access network node, where the webpage access and/or data service request includes the terminal identifier, the user identifier, and/or an IP address of the terminal. The Wi-Fi access network node checks whether the terminal identifier, the user identifier, and/or the IP address in the webpage access and/or data service request are included in legal user information. If the terminal identifier or the IP address of the terminal is included in the legal user information, the Wi-Fi access network node allows the terminal to access a corresponding service.

Preferably, the method 100 may further include deleting the registration information of the user.

Specifically, in one manner, the client on the terminal sends a deregistration request to the authentication server, where the deregistration request includes the terminal identifier and/or the user identifier that is not entered by the user, so that the authentication server deletes the registration information according to the terminal identifier and/or the user identifier that is not entered by the user in the deregistration request. Herein the manner of sending the deregistration request may be a sending manner used when the registration information of the user is sent to the authentication server, that is, forwarding by the short message service center or the communication gateway.

In another manner, when the terminal does not perform any operation within a period of time, the authentication server may also delete the registration information of the user by itself. For example, a timer with a preset period of time is started when the authentication server acquires and saves the registration information of the user, for example, the preset period of time is two hours. If the user does not perform any operation within the preset period of time, the authentication server deletes the registration information of the user when the timer expires, that is, deregisters the user, to reduce resource usage of the authentication server.

According to the embodiment of the present invention, in a case in which the authentication server deletes the registration information of the user, the authentication server may instruct the Wi-Fi access network node to delete the legal user information accordingly, for example, delete the terminal identifier, the user identifier, and/or the IP address assigned to the terminal from a legal user list. Alternatively, the Wi-Fi access network node may periodically synchronize registration information of a user stored on the authentication server to achieve an objective of deleting the registration information of the user.

The foregoing describes the implementation process of the method provided by the embodiment of the present invention from a perspective of a terminal. The following further describes an implementation process of a method provided by an embodiment of the present invention from perspectives of a Wi-Fi access network node and an authentication server separately.

Figure 2B:
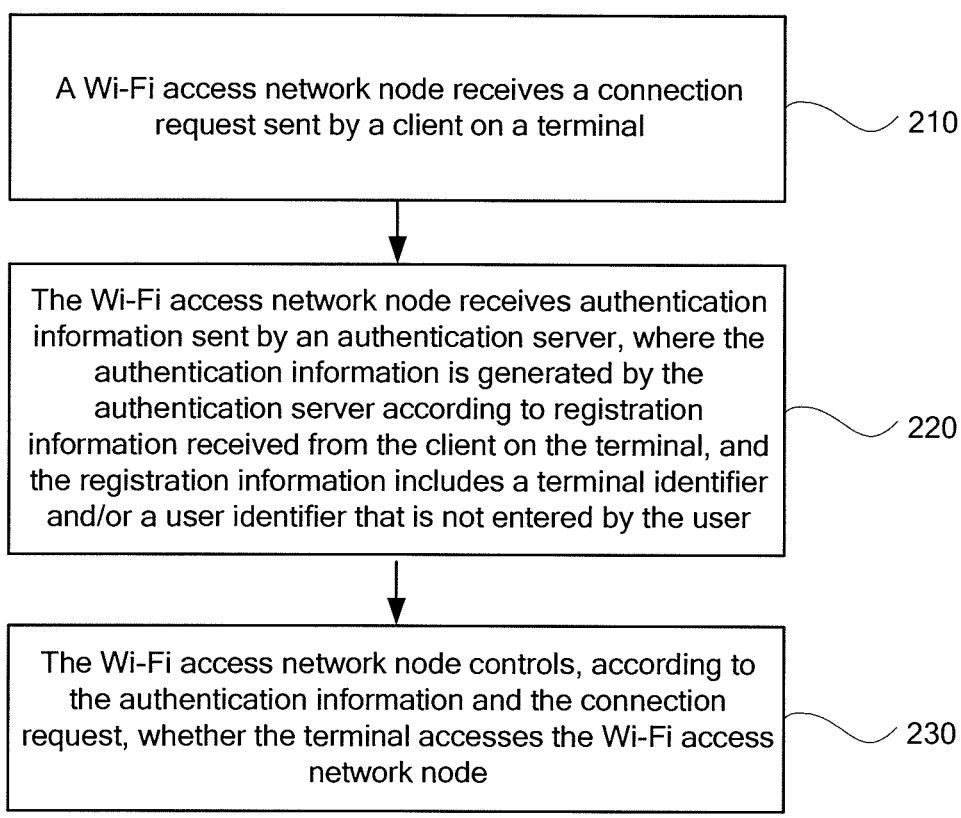
FIG. 2B is a schematic flowchart of a method according to an embodiment of the present invention.

From the perspective of a Wi-Fi access network node, as shown in FIG. 2B, a method 200 for accessing wireless network according to an embodiment of the present invention includes:

210. A Wi-Fi access network node receives a connection request sent by a client on a terminal.

Specifically, herein the connection request carries a terminal identifier and/or a user identifier that is not entered by a user. Preferably, the connection request may carry a name of an access network node selected by the user; in this way, a process of wireless access is further simplified. The foregoing terminal identifier may be a MAC address of the terminal that initiates the connection request, and the user identifier may be a mobile phone number.

220. The Wi-Fi access network node receives authentication information sent by an authentication server, where the authentication information is generated by the authentication server according to registration information received from the client on the terminal, and the registration information includes the terminal identifier and/or the user identifier that is not entered by the user.

In a specific example, at least the following two manners are available for acquiring the authentication information sent by the authentication server:

In one manner, after receiving the connection request sent by the terminal, the Wi-Fi access network node sends an authentication request to the authentication server, where the authentication request carries the terminal identifier and/or the user identifier in the connection request. Preferably, the authentication request may also carry an identifier or a name of the access network node to improve authentication efficiency and accuracy.

Then, the authentication server performs authentication according to the authentication request and stored registration information of the user. For example, specific content of the authentication includes: performing the authentication according to whether the terminal identifier in the connection request and the terminal identifier in the registration information of the user stored on the authentication server are consistent, and/or, performing the authentication according to whether the user identifier in the connection request and the user identifier in the registration information of the user stored on the authentication server are consistent, to determine whether the terminal/user that submits the connection request is the terminal logging in to the authentication server. In this situation, if the registration information of the user includes the name of the access network node and the connection request also includes the name of the access network node, the authentication may be performed additionally according to whether the name of the access network node in the connection request and the name of the access network node in the registration information are consistent. After an authentication process ends, the authentication server sends the authentication information, which is generated according to the registration information, to the Wi-Fi access network node. Herein the authentication information may be an indication result indicating whether the authentication is successful. For example, in a case in which the terminal identifier in the connection request and the terminal identifier in the registration information of the user stored on the authentication server are consistent, the authentication server sends an authentication response to the access network, where the authentication response carries a positive authentication result. Optionally, in a case in which the terminal identifier in the connection request and the terminal identifier in the registration information are consistent, and the name of the access network node in the connection request and the name of the access network node in the registration information are consistent, the authentication server sends an authentication response to the Wi-Fi access network node, where the authentication response carries a positive authentication result. Conversely, if not consistent, a response message sent by the authentication server to the Wi-Fi access network node carries a negative authentication result.

In brief, the foregoing step 220 may include: The Wi-Fi access network node generates the authentication request according to the connection request, where the authentication request carries the terminal identifier and/or the user identifier that is not entered by the user; that the Wi-Fi access network node receives authentication information sent by an authentication server specifically includes: The Wi-Fi access network node receives the authentication information generated by the authentication server after authentication is performed on the terminal according to the registration information and the authentication request, where the authentication information is used to indicate whether the terminal is successfully authenticated; when the terminal is successfully authenticated, the Wi-Fi access network node saves the terminal identifier and/or the user identifier in the connection request as legal user information.

In the other manner, the Wi-Fi access network node may also acquire all or part of registration information of the user stored on the authentication server by periodic or non-periodic synchronization, to ensure instantaneity of the legal user information. For example, a specific implementation process is: The Wi-Fi access network node sends the authentication request to the authentication server, where the authentication request is used to synchronize all or the part of registration information stored on the authentication server to the Wi-Fi access network node; and the Wi-Fi access network node receives the authentication information generated by the authentication server according to the authentication request, where the authentication information includes all or the part of registration information.

In brief, the step 220 may include: The Wi-Fi access network node sends the authentication request to the authentication server, where the authentication request is used to synchronize all or the part of registration information stored on the authentication server to the Wi-Fi access network node; and the Wi-Fi access network node receives the authentication information generated by the authentication server according to the authentication request, where the authentication information includes all or the part of registration information.

230. The Wi-Fi access network node controls, according to the authentication information and the connection request, whether the terminal accesses the Wi-Fi access network node.

Specifically, according to the authentication information, the Wi-Fi access network node saves the terminal identifier and/or the user identifier on which the authentication is successful, as legal user information.

Preferably, after the authentication information indicates that the terminal that sends the connection request is successfully authenticated, the Wi-Fi access network node assigns an Internet Protocol (Internet Protocol, IP for short) address to the terminal and saves the IP address as legal user information.

The foregoing legal user information may be stored in different manners, for example, by creating a legal user list and database.

Preferably, in a case in which the authentication is successful, the Wi-Fi access network node may send, to the terminal, the IP address assigned to the terminal. If the authentication fails, the Wi-Fi access network node may return a corresponding error status code to the terminal.

Preferably, the method 200 further includes: The Wi-Fi access network node receives a webpage access and/or data service request sent by the terminal, where the webpage access and/or data service request includes the terminal identifier, the user identifier, and/or the IP address of the terminal; and the Wi-Fi access network node forwards the webpage access and/or data service request to a corresponding web server and/or a data service server when determining that the terminal identifier, the user identifier, and/or the IP address of the terminal is included in the legal user information.

Preferably, the method 200 may further include:

The Wi-Fi access network node receives a deregistration request sent by the authentication server, where the deregistration request includes a terminal identifier, a user identifier, and/or an IP address; and the Wi-Fi access network node deletes, according to the terminal identifier and/or the user identifier in the deregistration request, the terminal identifier, the user identifier, and/or the IP address corresponding to the terminal identifier in the deregistration request from the legal user information.

Figure 2C:
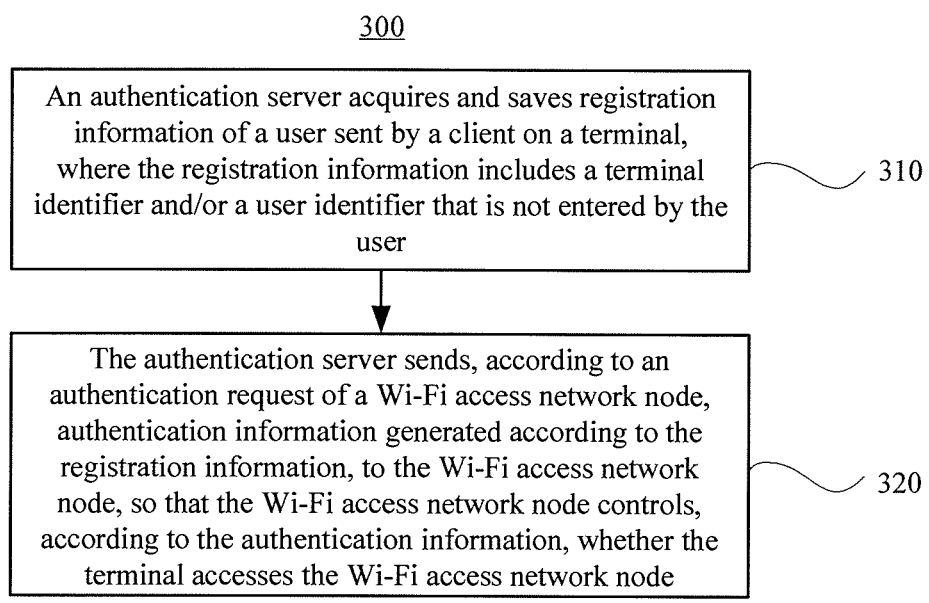
FIG. 2C is a schematic flowchart of a method according to an embodiment of the present invention.

From the perspective of an authentication server, as shown in FIG. 2C, a method 300 provided by an embodiment of the present invention includes:

310. An authentication server acquires and saves registration information of a user sent by a client on a terminal, where the registration information includes a terminal identifier and/or a user identifier that is not entered by the user.

Preferably, the authentication server may bind the terminal identifier and the user identifier as authentication reference information. Certainly, according to an actual situation, authentication may also be performed according to the terminal identifier only or according to the user identifier only.

Specifically, in step 310, the registration info nation of the user is generally identified by a network system itself and at least the following two preferable manners may be included:

The authentication server receives an SMS message sent by the client on the terminal and forwarded by a short message service center, and acquires the terminal identifier and/or the user identifier by parsing content and/or sender information of the SMS message;

or the authentication server receives a registration request forwarded by a communication gateway and acquires the terminal identifier and/or the user identifier by parsing content and/or sender information of the registration request.

320. The authentication server sends, according to an authentication request of a Wi-Fi access network node, authentication information generated according to the registration information, to the Wi-Fi access network node, so that the Wi-Fi access network node controls, according to the authentication information, whether the terminal accesses the Wi-Fi access network node.

Specifically, step 320 may include:

The authentication server receives the authentication request sent by the Wi-Fi access network node after a connection request of one or a plurality of terminals is received, where the authentication request carries a terminal identifier and/or a user identifier of the terminal that initiates the connection request;

the authentication server performs, according to the authentication request and the registration information, authentication on the terminal that initiates the connection request; and the authentication server sends the authentication information with respect to the authentication request message to the Wi-Fi access network node, where the authentication information is used to indicate whether the terminal that initiates the connection request is successfully authenticated;

or the authentication server receives the authentication request sent by the Wi-Fi access network node, where the authentication request is used to request synchronization of all or part of registration information; and the authentication server sends the authentication information to the Wi-Fi access network node according to the synchronization request message, where the authentication information includes all or the part of registration information, so that the Wi-Fi access network node performs, according to the authentication information, authentication on the terminal that initiates the connection request.

According to the embodiment of the present invention, as mentioned above, the registration information further includes an identifier or a name of one or a plurality of Wi-Fi access network nodes.

According to the embodiment of the present invention, as mentioned above, the method 300 may further include:

The authentication server deletes the registration information of the user according to a deregistration request sent by the client on the terminal, where the deregistration request includes the terminal identifier and/or the user identifier that is not entered by the user; or, when the user does not perform any operation within a period of time, the authentication server may also delete the registration information of the user by itself.

According to the embodiment of the present invention, user authentication can be conveniently and quickly performed by saving the terminal identifier and/or the user identifier of the terminal on the authentication server and the access network node, which avoids cumbersome user input operations and decreases a risk of user information theft. Meanwhile, in a solution provided by the embodiment of the present invention, a smaller change is made to an existing Wi-Fi network system, and only a corresponding upgrade needs to be performed on the authentication server and the access network node without adding a new network device. Therefore, implementation costs of the solution are lower.

Figure 3:
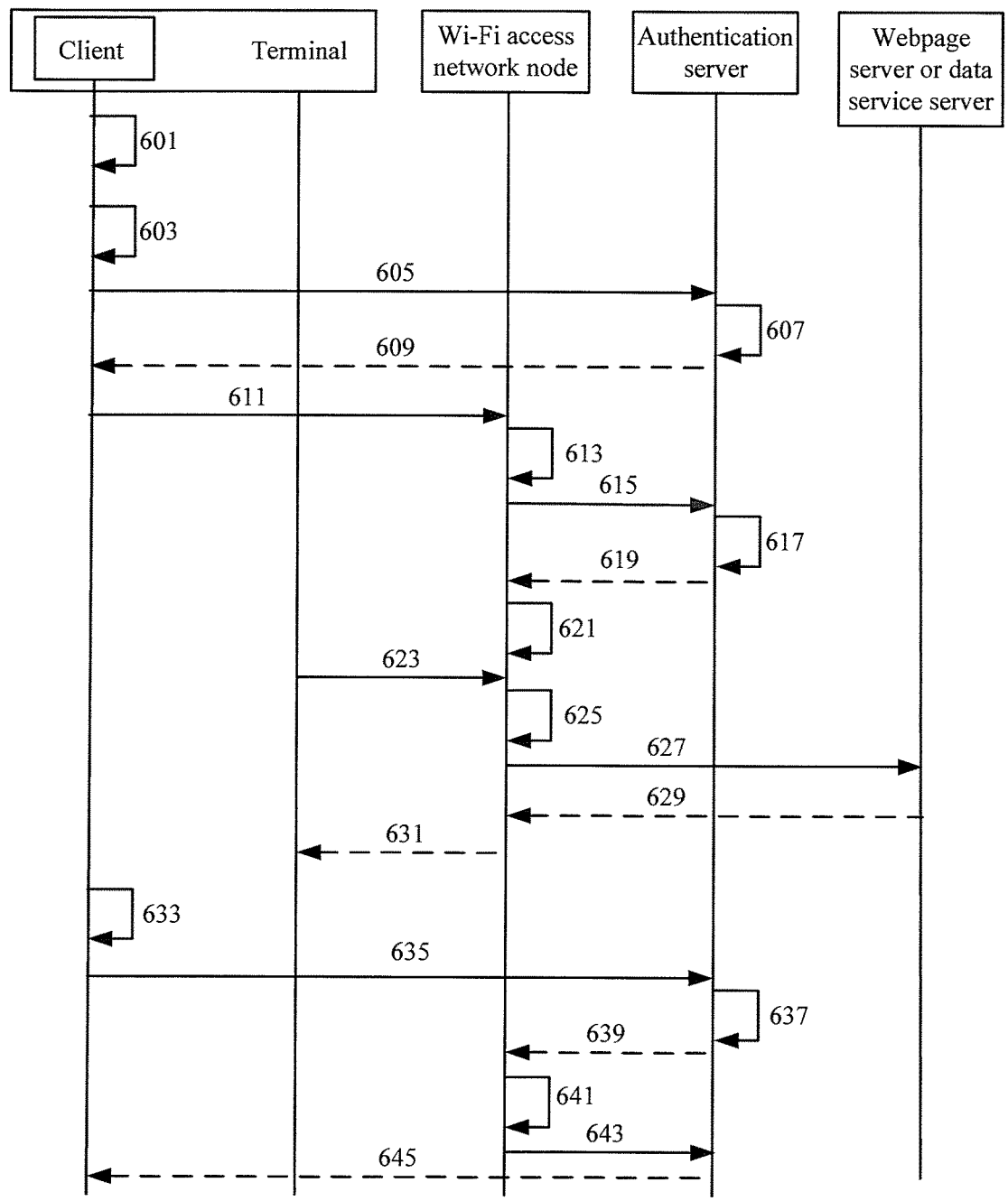
FIG. 3 is a flowchart of specific exemplary signaling exchanges in a method according to an embodiment of the present invention.

Referring to FIG. 3, FIG. 3 shows a flowchart of specific exemplary signaling exchanges in a method for accessing a wireless network according to an embodiment of the present invention. The process includes detailed steps of three parts, that is, terminal authentication, webpage access, and user deregistration. In the process shown in FIG. 3, a mobile phone as a terminal that accesses a webpage by using a Wi-Fi access network node is used as a specific example for description. The process shown in FIG. 3 specifically includes:

Terminal Authentication Phase:

601. A short message service number of an authentication server or an address of an authentication server is preset on a client.

603. The client searches for a Wi-Fi hotspot and lists a name of a Wi-Fi access point that is searched out, for a user to select to access.

605. The client logs in to the authentication server, and specifically, sends registration information of the user, where the registration information of the user includes a mobile phone number, a MAC address of the mobile phone, and the name of the Wi-Fi access network node selected by the user.

607. The authentication server saves the registration information of the user.

609. The authentication server returns a login result to the client.

611. The client connects to the Wi-Fi access network node selected by the user, where a connection request carries the MAC address of the mobile phone.

613. The Wi-Fi access network node acquires the MAC address of the mobile phone.

615. The Wi-Fi access network node initiates an authentication request to the authentication server, where the authentication request carries the MAC address of the mobile phone and the name of the Wi-Fi access network node.

617. The authentication server performs authentication according to the registration information of the user.

619. The authentication server returns authentication information to the Wi-Fi access network node.

621. The Wi-Fi access network node saves the valid MAC address of the mobile phone and/or an IP address assigned to the mobile phone as legal user information.

Webpage Access Phase:

623. The mobile phone initiates a website browsing request to the Wi-Fi access network node.

625. The Wi-Fi access network node determines that the MAC address or IP address of the mobile phone is included in the legal user information.

627. If the MAC address or the IP address of the mobile phone is included in the legal user information, the website browsing request is forwarded to a web server/data service server.

629. The Wi-Fi access network node acquires content of an accessed webpage.

631. The Wi-Fi access network node forwards the content of the accessed webpage to the mobile phone.

User Deregistration Phase:

633. The user enters a deregistration instruction on the client.

635. The client sends a deregistration request to the authentication server, where the deregistration request carries the mobile phone number, the MAC address of the mobile phone, and the name of the Wi-Fi access network node.

637. The authentication server deletes the corresponding registration information of the user according to the deregistration request.

639. The authentication server notifies the Wi-Fi access network node to delete the corresponding legal user information.

641. The Wi-Fi access network node deletes the corresponding legal user information according to the notification of the authentication server.

643. The Wi-Fi access network node returns a deletion result to the authentication server.

645. The authentication server returns a deregistration result to the client.

Accordingly, a specific implementation manner of the terminal, access network node, and authentication server for implementing the method for accessing wireless network according to the embodiments of the present invention is further provided, and is described in the following in detail with reference to the accompanying drawings.

Figure 4:
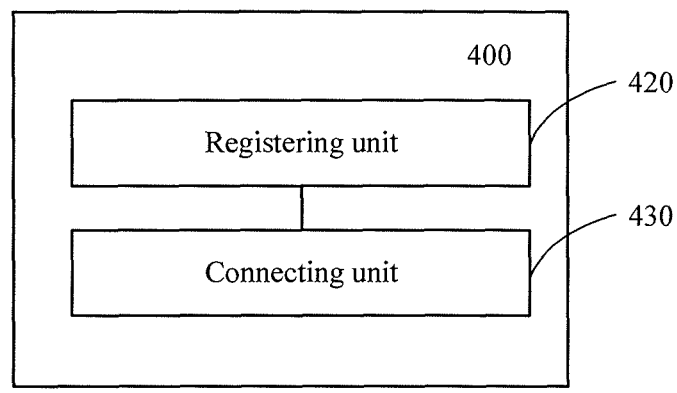
FIG. 4 is a schematic structural diagram of a terminal according to an embodiment of the present invention.

FIG. 4 is a schematic structural diagram of a terminal (400) according to an embodiment of the present invention. As shown in FIG. 4, the terminal (400) includes a client, where the client includes:

a registering unit (420), configured to send registration information of a user to an authentication server, where the registration information includes a terminal identifier and/or a user identifier that is not entered by the user, so that the authentication server sends authentication information, which is generated according to the registration information, to a Wi-Fi access network node; and a connecting unit (430), further configured to send a connection request to the Wi-Fi access network node, where the connection request includes the terminal identifier and/or the user identifier that is not entered by the user, so that the Wi-Fi access network node controls, according to the authentication information and the connection request, whether the terminal accesses the Wi-Fi access network node.

Figure 5:
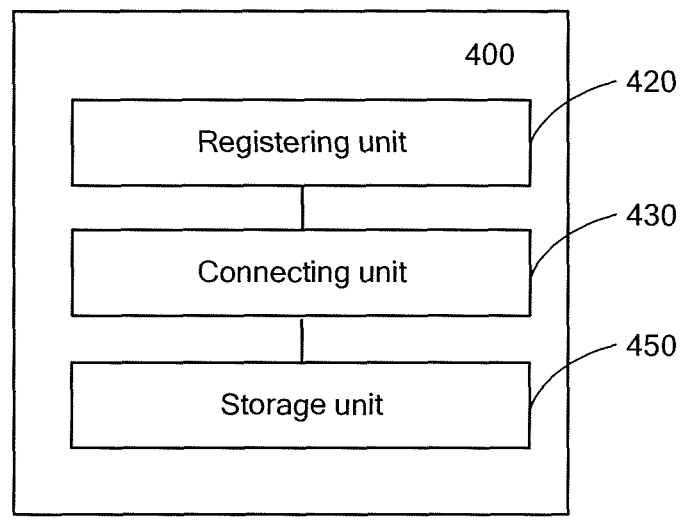
FIG. 5 is a schematic structural diagram of a terminal according to a further embodiment of the present invention.

Preferably, according to another embodiment of the present invention, as shown in FIG. 5, the terminal 400 may further include:

a storage unit (450), configured to store a service number or an address of the authentication server; where the registering unit (420) is configured to send an SMS message to the authentication server, so that the authentication server acquires the terminal identifier and/or the user identifier by parsing content or sender information of the SMS message; or the registering unit (420) is configured to send a registration request to the authentication server through a communication gateway according to the address, so that the authentication server acquires the terminal identifier and/or the user identifier according to content or sender information of the registration request.

Figure 6:
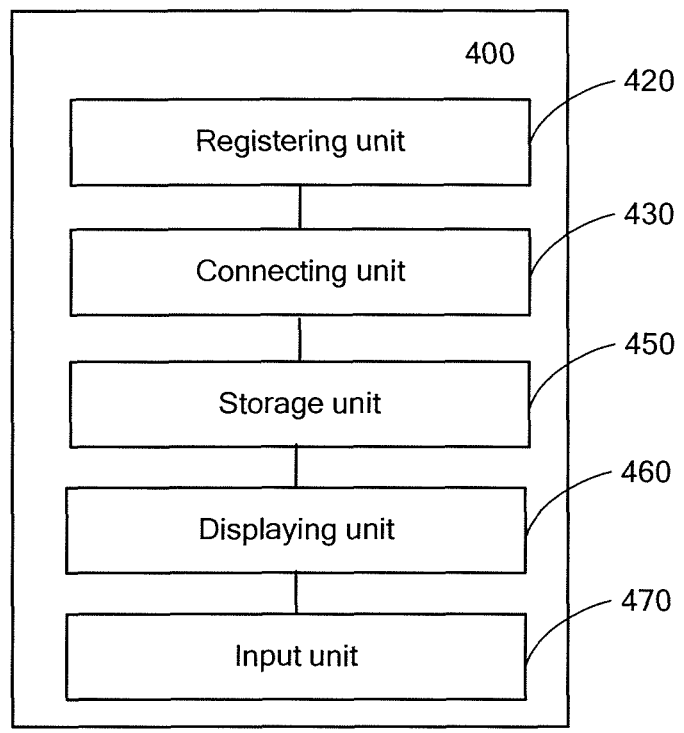
FIG. 6 is a schematic structural diagram of a terminal according to a further embodiment of the present invention.

Preferably, according to another embodiment of the present invention, as shown in FIG. 6, the terminal 400 may further include:

a displaying unit (460), configured to display an identifier or a name of a Wi-Fi access network node that is searched out; and an input unit (470), configured to receive an identifier or a name of a Wi-Fi access network node selected by the user, where the Wi-Fi access network selected by the user is the Wi-Fi access network that subsequently receives the registration information and the connection request.

Preferably, according to the embodiment of the present invention, the registration information further includes the identifier or the name of the Wi-Fi access network node.

According to the embodiment of the present invention, when the Wi-Fi access network node allows the terminal to access the Wi-Fi access network node, the displaying unit (460) is configured to display that the terminal has accessed the Wi-Fi access network; otherwise, the displaying unit (460) is configured to display that the terminal has not accessed the Wi-Fi access network.

According to the embodiment of the present invention, after the terminal (400) has accessed the Wi-Fi access network node or the displaying unit (460) displays that the terminal has accessed the Wi-Fi access network node, a processing unit (450) is configured to request, by using the Wi-Fi access network, to access a webpage or a data service.

Preferably, the terminal provided by the embodiment of the present invention may further include a deregistering unit (480) that is further configured to send a deregistration request to the authentication server, where the deregistration request includes the terminal identifier and/or the user identifier that is not entered by the user, so that the authentication server deletes the registration information according to the terminal identifier and/or the user identifier that is not entered by the user in the deregistration request.

Figure 7:
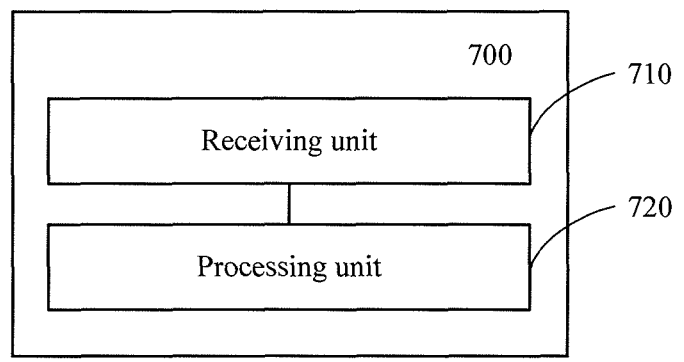
FIG. 7 is a schematic structural diagram of a Wi-Fi access network node according to an embodiment of the present invention.

FIG. 7 is a schematic structural diagram of a Wi-Fi access network node 700 according to an embodiment of the present invention. As shown in FIG. 7, the Wi-Fi access network node 700 includes:

a receiving unit (710), configured to receive a connection request sent by a client on a terminal, where the connection request includes a terminal identifier and/or a user identifier that is not entered by a user; and configured to receive authentication information sent by an authentication server, where the authentication information is generated by the authentication server according to registration information received from the client on the terminal, and the registration information includes the terminal identifier and/or the user identifier that is not entered by the user; and a processing unit (720), configured to control, according to the authentication information and the connection request, whether the terminal accesses the Wi-Fi access network node.

Figure 8:
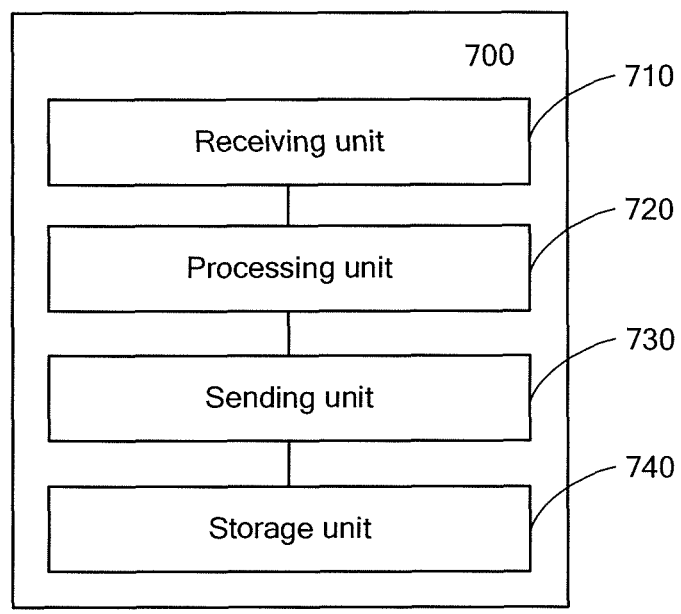
FIG. 8 is a schematic structural diagram of a Wi-Fi access network node according to a further embodiment of the present invention.

Preferably, according to the embodiment of the present invention, the processing unit (720) is further configured to generate an authentication request according to the connection request, where the authentication request carries the terminal identifier and/or the user identifier that is not entered by the user; as shown in FIG. 8, the access network node (700) may further include:

a sending unit (730), configured to send the authentication request to the authentication server, where the receiving unit (710) is configured to receive the authentication information generated by the authentication server after authentication is performed on the terminal according to the registration information and the authentication request, where the authentication information is used to indicate whether the terminal is successfully authenticated.

Preferably, the access network node (700) may further include:

a storage unit (740), configured to save the terminal identifier and/or the user identifier in the connection request as legal user information.

Preferably, according to the embodiment of the present invention, the processing unit (720) is further configured to assign an Internet Protocol IP address to the terminal, and the storage unit (740) is further configured to save the IP address as legal user information.

According to the embodiment of the present invention, the receiving unit (710) is further configured to receive a webpage access and/or data service request sent by the terminal, where the webpage access and/or data service request includes the terminal identifier and/or the IP address of the terminal;

the processing unit (720) is configured to determine that the terminal identifier and/or the IP address of the terminal is included in the legal user information; and the sending unit (730) is further configured to forward the webpage access and/or data service request to a corresponding web server and/or a data service server.

Preferably, according to the embodiment of the present invention, the receiving unit (710) is configured to receive a deregistration request sent by the authentication server, where the deregistration request includes the terminal identifier; and the storage unit (740) deletes, according to the terminal identifier in the deregistration request, the terminal identifier and/or the IP address corresponding to the terminal identifier in the deregistration request from the legal user information.

Preferably, according to the embodiment of the present invention, the sending unit (730) is configured to send the authentication request to the authentication server, where the authentication request is used to synchronize all or part of registration information stored on the authentication server to the access network node (700); accordingly, the receiving unit (710) is configured to receive the authentication information generated by the authentication server according to the authentication request, where the authentication information includes all or the part of registration information; and the storage unit 740 is configured to save all or the part of registration information in the legal user information.

Figure 9:
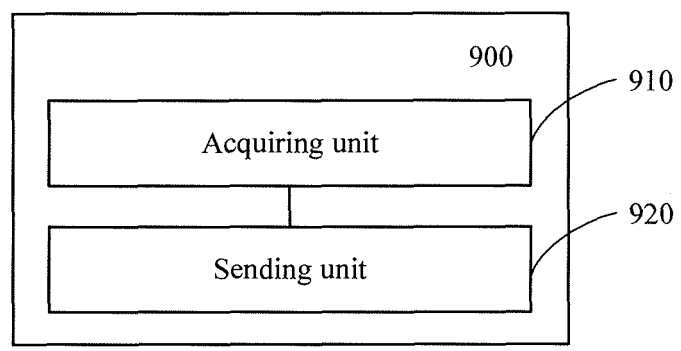
FIG. 9 is a schematic structural diagram of an authentication server according to an embodiment of the present invention.

FIG. 9 is a schematic structural diagram of an authentication server (900) according to an embodiment of the present invention. As shown in FIG. 9, the authentication server (900) includes:

an acquiring unit (910), configured to acquire and save registration information of a user sent by a client on a terminal, where the registration information includes a terminal identifier and/or a user identifier that is not entered by the user; and a sending unit (920), configured to send, according to an authentication request of a Wi-Fi access network, authentication information generated according to the registration information, to the Wi-Fi access network, so that the Wi-Fi access network node controls, according to the authentication information, whether the terminal accesses the Wi-Fi access network node.

Preferably, according to the embodiment of the present invention, the acquiring unit (910) is configured to receive an SMS message forwarded by a short message service center, where the terminal identifier and/or the user identifier is acquired by parsing content and/or sender information of the SMS message; or, the acquiring unit (910) is configured to receive a registration request forwarded by a communication gateway, where the terminal identifier and/or the user identifier is acquired by parsing content and/or sender information of the registration request.

Figure 10:
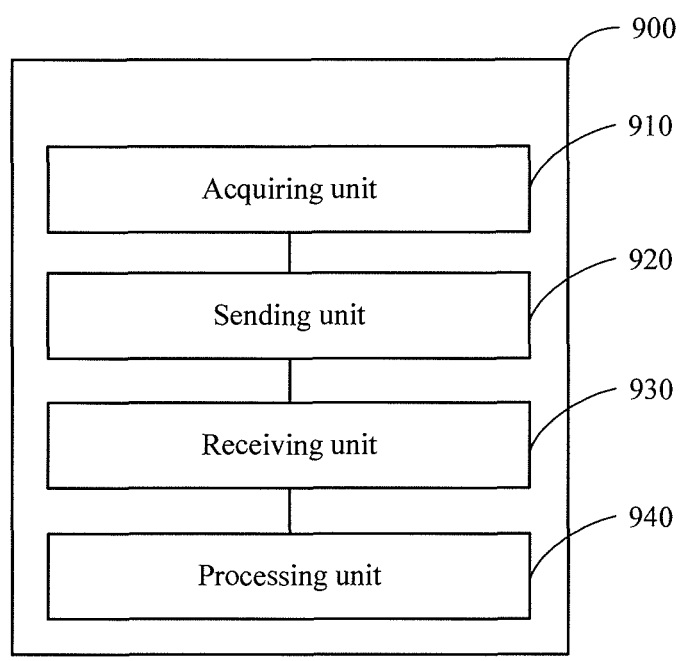
FIG. 10 is a schematic structural diagram of an authentication server according to a further embodiment of the present invention.

Preferably, according to the embodiment of the present invention, as shown in FIG. 10, the authentication server 900 may further include:

a receiving unit (930), configured to receive the authentication request sent by the Wi-Fi access network node after a connection request of one or a plurality of terminals is received, where the authentication request carries a terminal identifier and/or a user identifier of the terminal that initiates the connection request; and a processing unit (940), configured to perform, according to the authentication request message and the registration information of the user, authentication on the terminal that initiates the connection request, where the sending unit (920) is configured to send the authentication information with respect to the authentication request message to the Wi-Fi access network node, where the authentication information is used to indicate whether the terminal that initiates the connection request is successfully authenticated;

or, preferably, in the embodiment of the present invention:

the receiving unit (930) is configured to receive the authentication request sent by the Wi-Fi access network node, where the authentication request is used to request synchronization of all or part of registration information; and the sending unit (920) is configured to send the authentication information to the Wi-Fi access network node according to the synchronization request message, where the authentication information includes all or the part of registration information, so that the Wi-Fi access network node performs, according to the authentication information, authentication on the terminal that initiates the connection request.

According to the embodiment of the present invention, the registration information further includes an identifier or a name of one or a plurality of Wi-Fi access networks.

Preferably, according to the embodiment of the present invention, the acquiring unit (910) is further configured to delete the registration information of the user according to a deregistration request sent by the client on the terminal, where the deregistration request includes the terminal identifier and/or the user identifier that is not entered by the user; or, the acquiring unit (910) automatically deletes the corresponding terminal identifier and/or the user identifier in a case in which the terminal does not perform any operation within a period of time.

Figure 11:
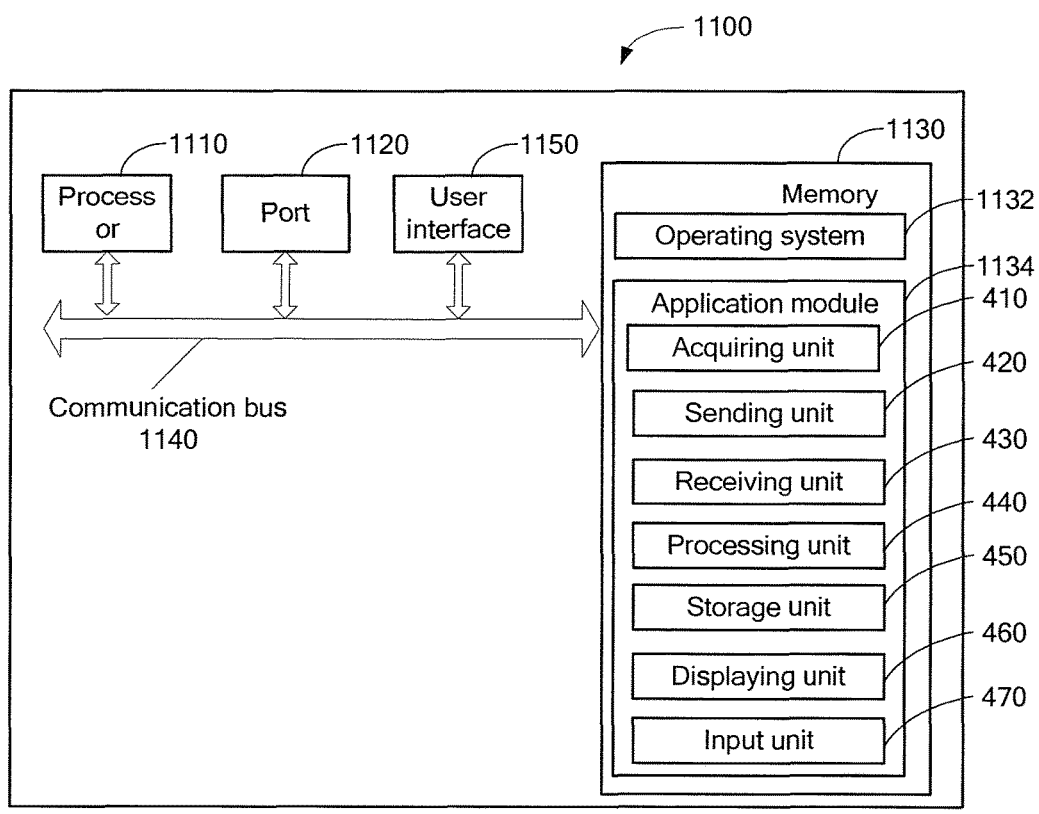
FIG. 11 is a schematic structural diagram of a terminal in another form according to an embodiment of the present invention.

FIG. 11 is a schematic structural diagram of a terminal according to an embodiment of the present invention. As shown in FIG. 11, the terminal usually includes at least one processor 1110, for example, a CPU, at least one port 1120, a memory 1130, and at least one communication bus 1140. The communication bus 1140 is configured to implement communication between the apparatuses. The processor 1110 is configured to execute an executable module stored in the memory 1130, for example, a computer program; optionally, the terminal includes a user interface 1150, where the user interface 1150 includes but is not limited to a display, a keyboard, and a clicking device, for example, a mouse, a trackball (trackball), a touch-sensitive pad, or a touch sensitive screen. The memory 1130 may include a high speed RAM memory, and may also include a non-volatile memory (non-volatile memory), for example, at least one magnetic disk memory. The terminal implements the communication and connection with at least one authentication server through the at least one port 1120 and implements the communication and connection with at least one Wi-Fi access network node through at least another port 1120.

In some implementation manners, the memory 1130 stores the following elements: an executable module or a data structure, or a subset thereof, or an extended set thereof:

an operating system 1132, including various system programs and configured to implement various basic services and process hardware-based tasks; and an application module 1134, including various application programs and configured to implement various application services.

The application module 1134 includes but is not limited to the registering unit (420), the connecting unit (430), the storage unit (450), the displaying unit (460), and the input unit (470).

For specific implementation of various units in the application module 1134, reference may be made to the corresponding units in the embodiments illustrated in FIG. 4 to FIG. 6, and details are not described herein again.

Figure 12:
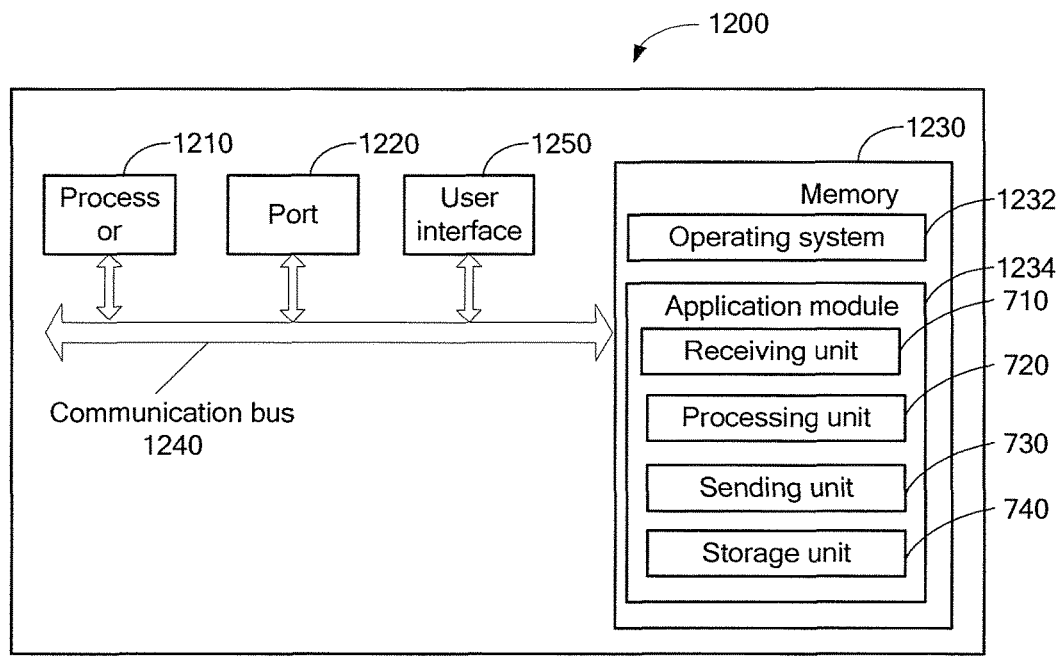
FIG. 12 is a schematic structural diagram of a Wi-Fi access network node in another form according to an embodiment of the present invention.

FIG. 12 is a schematic structural diagram of a Wi-Fi access network node according to an embodiment of the present invention. As shown in FIG. 12, the Wi-Fi access network node usually includes at least one processor 1210, for example, a CPU, at least one port 1220, a memory 1230, and at least one communication bus 1240. The communication bus 1240 is configured to implement a connection and communication between the apparatuses. The processor 1210 is configured to execute an executable module stored in the memory 1230, for example, a computer program; optionally, the Wi-Fi access network node includes a user interface 1250, where the user interface 1250 includes but is not limited to a display, a keyboard, and a clicking device, for example, a mouse, a trackball (trackball), a touch-sensitive pad, or a touch-sensitive screen. The memory 1230 may include a high speed RAM memory, and may also include a non-volatile memory (non-volatile memory), for example, at least one magnetic disk memory. Through the at least one port 1220, the Wi-Fi access network node implements the communication and connection between an authentication server and a terminal acting as a communication peer end. In some implementation manners, the memory 1230 stores the following elements: an executable module or a data structure, or a subset thereof, or an extended set thereof:

an operating system 1232, including various system programs and configured to implement various basic services and process hardware-based tasks; and an application module 1234, including various application programs and configured to implement various application services.

The application module 1234 includes but is not limited to one or a combination of the following units: the receiving unit (710), processing unit (720), sending unit (730), and storage unit (740).

For specific implementation of the receiving unit (710), processing unit (720), sending unit (730), and storage unit (740), reference may be made to the corresponding units in the embodiments shown in FIG. 7 and FIG. 8.

Figure 13:
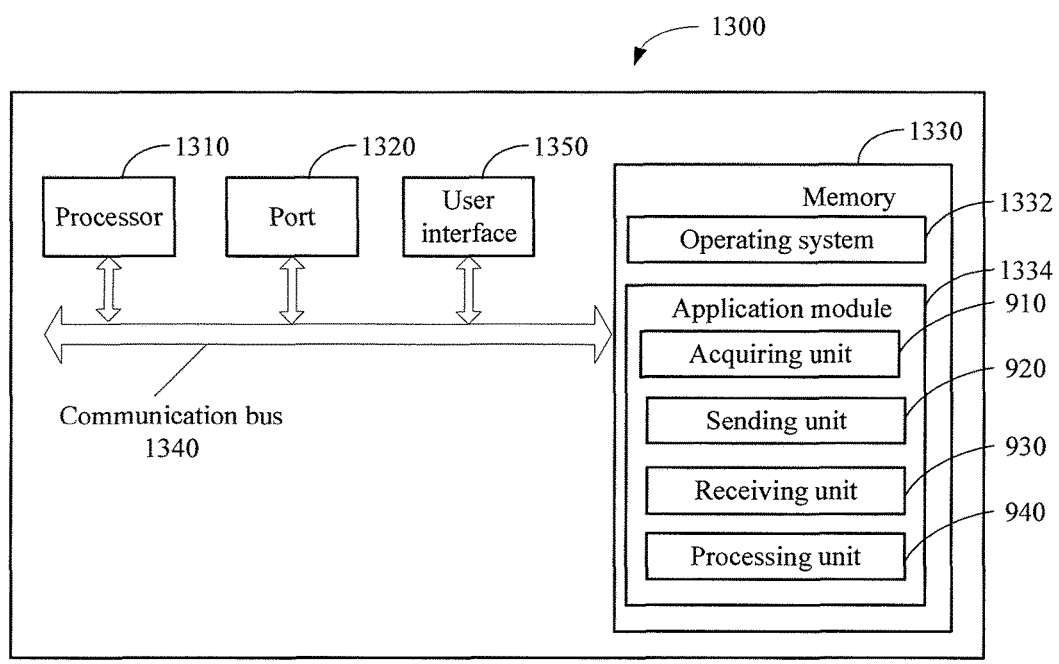
FIG. 13 is a schematic structural diagram of an authentication server in another form according to an embodiment of the present invention.

FIG. 13 is a schematic structural diagram of an authentication server according to an embodiment of the present invention. As shown in FIG. 13, the authentication server usually includes at least one processor 1310, for example, a CPU, at least one port 1320, a memory 1330, and at least one communication bus 1340 configured to implement a connection and communication between the apparatuses. The processor 1310 is configured to execute an executable module stored in the memory 1330, for example, a computer program; optionally, the authentication server includes a user interface 1350, where the user interface 1350 includes but is not limited to a display, a keyboard, and a clicking device, for example, a mouse, a trackball (trackball), a touch-sensitive pad, or a touch-sensitive screen. The memory 1330 may include a high speed RAM memory, and may also include a non-volatile memory (non-volatile memory), for example, at least one magnetic disk memory. The authentication server implements the communication and connection with a terminal and a Wi-Fi access network node through the communication port 1320.

In some implementation manners, the memory 1330 stores the following elements: an executable module or a data structure, or a subset thereof, or an extended set thereof:

an operating system 1332, including various system programs and configured to implement various basic services and process hardware-based tasks; and an application module 1334, including various application programs and configured to implement various application services. The application module 1334 includes but is not limited to one or a combination of the following units: the acquiring unit (910), sending unit (920), receiving unit (930), and processing unit (940).

For specific implementation of the acquiring unit (910), sending unit (920), receiving unit (930), and processing unit (940), reference may be made to the corresponding units in the embodiments shown in FIG. 9 and FIG. 10.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for accessing a wireless network, the method comprising:
   receiving, by a Wi-Fi access network node, a connection request sent by a client terminal, wherein the connection request comprises a terminal identifier of the client terminal and/or an identifier regarding a user associated with the client terminal;
   after receiving, by the Wi-Fi access network node, the connection request sent by a client terminal, the method further comprises:
   generating, by the Wi-Fi access network node, an authentication request according to the connection request, wherein the authentication request comprises the terminal identifier and/or the identifier regarding the user;
   receiving, by the Wi-Fi access network node, the authentication information from the authentication server, wherein the authentication information is generated by the authentication server according to registration information received from the client terminal when the client terminal makes the connection request to the Wi-Fi access network node and the registration information comprises the terminal identifier and/or the identifier regarding the user,
   wherein receiving, by the Wi-Fi access network node, the authentication information sent by the authentication server comprises:
   receiving, by the Wi-Fi access network node, the authentication information generated by the authentication server after authentication is performed on the client terminal according to the registration information and the authentication request, wherein the authentication information is used to indicate whether the client terminal is successfully authenticated, and
   when the authentication information indicates that the client terminal is successfully authenticated, saving, by the Wi-Fi access network node, the terminal identifier and/or the identifier regarding the user in the connection request as legal user information; and
   determining, by the Wi-Fi access network node according to the authentication information and the connection request, whether the client terminal has access to the Wi-Fi access network node; and, wherein the method further comprises
   when determining whether the client terminal has access to the Wi-Fi access network node, receiving, by the Wi-Fi access network node, a webpage access and/or data service request sent by the terminal, wherein the webpage access and/or data service request comprises the terminal identifier and/or the IP address of the terminal; and
   forwarding, by the Wi-Fi access network node, the webpage access and/or data service request to a corresponding web server and/or a data service server when determining that the terminal identifier and/or the IP address of the terminal is comprised in the legal user information;
   wherein the method further comprises:
   sending, by the Wi-Fi access network node, the authentication request to the authentication server, wherein the authentication request is used to synchronize all or part of registration information stored on the authentication server to the Wi-Fi access network node; and
   receiving, by the Wi-Fi access network node, the authentication information generated by the authentication server according to the authentication request, wherein the authentication information comprises all or the part of registration information.

2. The method according to claim 1, wherein the method further comprises: assigning, by the Wi-Fi access network node, an Internet Protocol (IP) address to the client terminal, and saving the IP address as the legal user information.

3. The method according to claim 1, wherein the method further comprises:

receiving, by the Wi-Fi access network node, a deregistration request sent by the authentication server, wherein the deregistration request comprises the terminal identifier; and deleting, by the Wi-Fi access network node according to the terminal identifier in the deregistration request, the terminal identifier and/or the IP address corresponding to the terminal identifier in the deregistration request from the legal user information.

* * * * *